Jan. 6, 1970  A. MAROSY  3,487,512

COUPLING

Filed Feb. 12, 1968

INVENTOR
ANDRE MAROSY

BY *Whittemore Hulbert & Belknap*

ATTORNEYS 3,487,512
COUPLING
Andre Marosy, 24731 Kipling Ave.,
Oak Park, Mich. 48237
Filed Feb. 12, 1968, Ser. No. 704,813
Int. Cl. F16g 11/03
U.S. Cl. 24—221                                    12 Claims

ABSTRACT OF THE DISCLOSURE

The coupling includes a male member and a female member. The male member includes a cap for fitting over the female member. A rod extends from the cap. At least one, preferably two, lateral extensions are provided on the rod adjacent the ends thereof. The female member includes a tubular housing having an end closure with an opening to receive the rod. The end closure has notches to receive the lateral extensions of the rod.

A locking element is slidably mounted within the tubular housing and guide means are provided therein in engagement with the locking element to permit longitudinal sliding of the locking element but prevent rotation of the locking element with respect to the tubular housing. Spring means are provided in the housing to bias the locking element towards the end closure.

The locking element comprises a disc-shaped member having at least one, preferably two, marginal edge portions which are spiraled outwardly in the same rotative direction around the periphery of the disc-shaped member and toward the end closure of the tubular housing. The guide means position the locking element with a portion of the marginal edge portion thereof in alignment with the notches in the end closure of the tubular housing.

Insertion of the male member through the end closure results in contact of the extensions with the marginal edge portions. Initially, the locking element is forced inwardly against the action of the spring. After the extensions have passed by the end closure, the marginal edge portions cam the extensions and cause rotation of the male member about its axis. The guide means limit the amount of rotation of the male member. Upon complete insertion of the extensions into the tubular housing and rotation thereof to contact the guide means, the male member is released and the spring biases the locking element and male member back toward the end closure. The extensions are then out of alignment with the notches in the end closure and the coupling remains in coupled condition until such time as the male member is manually rotated to again place the extensions in alignment with the notches to permit uncoupling of the device.

BACKGROUND OF THE INVENTION

There are many instances where it is desired to have a coupling which will automatically and positively lock when the coupling members are joined together. For example, the conventional latch on the hood of an automobile is designed to permit automatic latching upon closure of the hood and unlatching of the hood only as a result of a positive manual action releasing the latch. Convenience and safety are primary considerations in this construction. It is, of course, very dangerous to have an automobile hood become unlatched during operation of the vehicle. It is desirable, therefore, that the operator be assured that the hood is firmly latched before driving the vehicle. Automatic latching of the hood as opposed to manual latching tends to insure this result. Further, the operator of the vehicle is assured that the hood will only open upon manual actuation of the unlatching mechanism. Consequently, the hood will not inadvertently open during operation of the vehicle.

A further consideration in the automotive industry is the expense of the latching mechanism. It is, of course, well known that the automotive industry constantly strives to reduce the cost of component parts of automobiles while still maintaining effective quality.

In my Patent No. 3,286,316, issued Nov. 22, 1966, I have disclosed a coupling mechanism which automatically locks and which requires manual action in order to be unlocked. The present invention comprises an improvement over my previous development. The improvement is particularly directed to the locking element which results in the self-locking feature. The locking mechanism of the present invention not only accomplishes the self-locking and manual unlocking feature previously disclosed, but is less expensive to manufacture and has an improved aligning and latching mechanism to accommodate the rough usage and relatively wide dimensional tolerances common in the automotive field.

While the present invention has particular use in the automotive field, it also has application in other areas such as the jewelry art, the electrical art for connecting wires or cables and the mechanical art for connecting such members as tubes, garden hoses, flexible support members such as ropes and the like.

SUMMARY OF THE INVENTION

The coupling comprises a male member and a female member. The male member comprises a rod having at least one lateral extension adjacent one end thereof. The female member comprises a tubular housing. The housing has an end closure with an opening which includes a notch operative to receive the end of the rod with the lateral extension received in the notch. A locking element is slidably mounted within the tubular housing. Guide means are provided in the tubular housing in engagement with the locking element. Means are provided for biasing the locking element towards the end closure.

The major improved portion of the invention resides in the structure of the locking element which comprises a disc-shaped member. The disc-shaped member has at least one marginal edge portion which is spiraled outwardly therefrom around the periphery thereof towards the end closure. The guide means positions the locking element with a section of the marginal edge portion in alignment with the notch in the end closure of the tubular housing whereby the insertion of the rod of the male member through the end closure results in contact of the extension with the marginal edge portion. This forces the locking element away from the end closure with the marginal edge portion camming the extension to rotate the male member about its axis after insertion of the extension through the end closure.

The locking element has a central opening to receive the inner end of the rod to thereby position and orient the rod with respect to the locking element. Similarly, the opening in the end closure of the housing functions to orient and guide the rod with respect to the housing. The guide means may comprise a tubular body press fitted into the tubular housing. The biasing means is preferably a spring which is received within the tubular body. At least one guide rod extends from the tubular body. The locking element has a notch which is received on the guide rod to thereby position the locking element and prevent rotation thereof with respect to the tubular housing while still permitting longitudinal travel of the locking element. The marginal edge portion of the locking element has a surface which contacts at least one edge of the lateral extension on the rod. The surface is configured in a path defined by the longitudinal and rotative movement of the contacting edge of the lateral extension whereby there is always contact between the edge of the lateral extension and the surface of the marginal edge portion during insertion of the male member into the female member.

Figure 1:
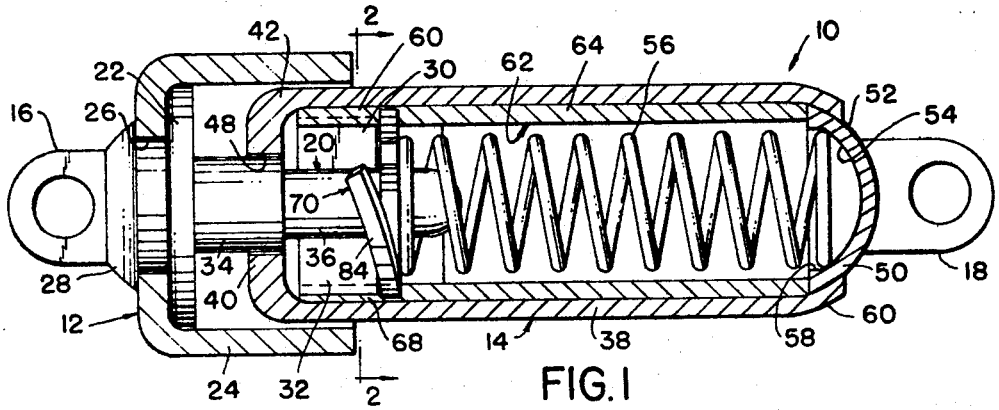
FIGURE 1 is a longitudinal sectional view of one embodiment of the coupling of the present invention.
Figure 4:
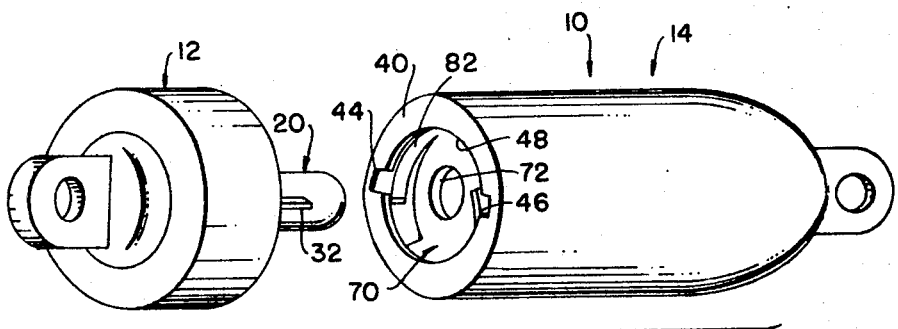
FIGURE 4 is a perspective view of the coupling of FIGURE 1 illustrating the manner in which the coupling members are fastened together.

Referring to FIGURE 1, the coupling generally indicated at 10 comprises a male member 12 and a female member 14. These members have a coupled position as shown in FIGURE 1 wherein they are locked together and an uncoupled position as illustrated in FIGURE 4 wherein they are separated. Each member is illustratively provided with a ring 16, 18 which may be connected to a necklace chain or other similar device. However, it should be appreciated that the coupling may be used to connect a variety of different items as, for example, the hood of an automobile to the body of the automobile, pneumatic and hydraulic tubes, and electrical wiring.

The male member 12 comprises an elongated rod 20 which is provided with the ring 16 on its outer end. A collar 22 is provided on the rod 20. A cap 24 having an opening 26 is initially received on the rod 20 and abuts against the collar 22. A portion 28 of the rod is then staked over to secure the cap 24 in place. The rod has a pair of lateral key-line extensions 30, 32 adjacent the inner end thereof. The extensions 30, 32 are generally rectangular in form and are displaced at 180° with respect to each other to thereby extend in diametrically opposite directions. It will be noted that the portion 34 of the rod 20 extending from the collar 22 to the extensions 30, 32 is enlarged with respect to the remaining portion 36. This arrangement facilitates aligning of the members as will be later described.

The female member 14 includes a tubular element 38 having one end portion turned over to form an annular flange 40. It will be noted that the thickness of the flange 40 is approximately equal to twice the thickness of the remaining portions of the wall of the tubular element 38. This increased thickness of the flange 40 and the curved corner portion 42 which merges with the straight portion of the tubular element 38, provides a rigid, strong section in the area of greatest stress thereby preventing breaking or bending of the female member at this point. A pair of diametrically opposed notches or slots 44, 46 are provided in the annular flange 40 to register with the extensions 30, 32 of the male member 12. The flange 40 defines a central opening 48 for the reception of the rod 20 of the male member. It will be noted in FIGURE 1 that the diameter of the opening 48 is just slightly larger than the diameter of the enlarged portion 34 of the rod 20. Thus, after the rod 20 has been inserted into the opening 48 and the extensions 30, 32 have passed the flange 40, the rod portion 34 is locked in place and prevents rattling or canting of the members. However, upon initial insertion of the rod 20, the portion 36 of reduced diameter is easily inserted through the opening 48. The rod 20 is thus guided into the opening 48.

A connector and closure element 50 is provided in the other end of the tubular element 38. It will be noted that the connector element 50 is cup-shaped having a convex exterior surface 52 and a concave interior surface 54 which defines a shallow recess for the reception of one end of a coil spring 56 which is contained within the tubular element 38. The inner marginal portion 58 of the connector element 50 is straight sided to form a recess having a diameter slightly greater than the diameter of the spring 56 thereby acting as a holder and retainer for the end of the spring. The ring 18 is secured to the exterior convex surface 52 of the connector 50. The end portion 60 of the tubular element 38 is crimped over to secure the connector 50 in place.

A hollow cylindrical guide member 62 is received within the tubular element 38. The exterior diameter of the guide member 62 is approximately equal to the interior diameter of the tubular element 38. The guide member is forced into the tubular element in a press fit so as to prevent rotation of the guide member within the tubular element. The guide member 62 comprises a solid tubular portion 64 which extends from the inner edge of the connector 50 to a point intermediate the ends of the tubular elements 38. A pair of diametrically opposed generally rectangular guide elements 66, 68 extend from the tubular portion 64 and terminate at the other end of the tubular element 38. The length of the guide elements 66, 68 is approximately equal to the depth of the extensions 30, 32 of the male member 12 plus the thickness of a locking element 70 which is received in the tubular element 38 between the spring 56 and annular flange 40.

The locking element 70 comprises a circular disc having a central opening 72 for reception of the reduced diameter portion 36 of the rod 20. The opening 72 is of slightly larger diameter than the portion 36 for easy insertion and withdrawal of the rod. A pair of diametrically opposed notches 74, 76 are provided in the outer marginal peripheral portions of the locking element 70. The notches 74, 76 are received on the guide elements 66, 68. It will thus be appreciated that the locking element 70 may slide longitudinally with respect to the tubular element 38, but cannot rotate relative thereto.

Figures 2, 3:
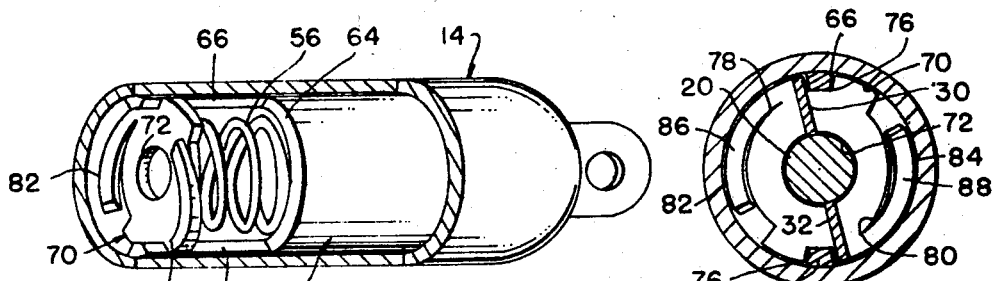
FIGURE 2 is a sectional view taken substantially along the line 2—2 of FIGURE 1 looking in the direction of the arrows.
FIGURE 3 is a perspective view of the female coupling member of FIGURE 1 with parts broken away for the purpose of clarity.

The locking element 70 is slit along curved lines 78, 80 each of which extend from a point adjacent one of the notches 74, 76 towards the other notch 74, 76 and terminate adjacent thereto. The marginal portion 82, 84 of the locking element are bent away from the locking elements and formed into a helical spiral. The surface portions 86, 88 which face the opening 48 in the annular flange 40 have a generally parabolic curvature in order to facilitate coupling of the device as will be described. The free ends of the portion 82, 84 are in registry with the notches 44, 46 in the annular flange 40 in order to be in the path of the extensions 30, 32 on the rod 20 when the male member 12 is inserted into the female member 14. The coil spring 56 biases the locking element 70 towards the flange 40 to a position illustrated in FIGURES 3 ad 4. It will be noted that the surfaces 86, 88 of the locking element 70 extend away from the notches 44, 46 in a clockwise direction as viewed in FIGURES 3 and 4 and are sloped inwardly towards the connector 50.

Operation of the device may now be understood. Referring to FIGURE 4, it will be noted that the coupling is connected by first aligning the lateral extensions 30, 32 of the male member 12, with the notches 44, 46 in the annular flange 40. The male member 12 is then inserted into the female member 14. When the extensions 30, 32 abut against the surfaces 86, 88 of the helical portions 82, 84, the locking element 70 is forced into the tubular element 38 against the action of the spring 56. As soon as the lateral extensions 30, 32 have passed the annular flange 40, the male member 12 is free to rotate. Further insertion of the male member results in turning of the male member due to the camming action of the surfaces 86, 88 against the extensions 30, 32. The male member is eventually turned an angle of approximately 75° to the position shown in FIGURE 2. At this point, further turning of the male member 12 is stopped by the guide elements 66, 68. The male member is then released and the spring 56 urges the locking element 70 and the male member toward the flange 40 whereby the extensions 30, 32 abut the annular flange 40 to thus lock the coupling in the connected condition. The coupling may be disconnected by manually turning the male member 12 in the reverse direction to align the extensions 30, 32 with the notches 44, 46 and then withdrawing the male member.

Figures 5, 6:
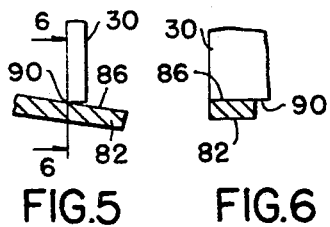
FIGURE 5 is a view of a lateral extension of the male member in contact with the locking element of the female member.
FIGURE 6 is a sectional view taken substantially along the line 6—6 of FIGURE 5 looking in the direction of the arrows.

FIGURES 5 and 6 illustrate the contact which is had between the lateral extensions of the male member and the camming surfaces of the female member during the insertion or extraction of the male member 12. As will be noted in these figures, the rear edge 90 of the extension 30 is in line contact over the entire width of the surface 86. This contact is maintained throughout the entire camming action during insertion and extraction of the male member. The slope of the surface 86 is configured to match the longitudinal movement and simultaneous rotation of the edge 90 of the extension 30. The advantage of such a configuration is that wear on both the extension 30 and portion 82 of the locking element 70 takes place over the entire surface area. If the extension only contacted the surface portion 82 along one corner surface as would be the case of the surface 82 were not curved to match the motion of the edge 90 of the extension, there would be exceesive wear along both the corner edge of the portion 82 and the contacting portion of the extension. It will be appreciated that the bottom of the extension may be slanted to thus provide surface to surface contact between the extension and surface portion 82.

What I claim as my invention is:

1. In a coupling comprising a male member and a female member, the male member comprising a rod having at least one lateral extension adjacent one end thereof, the female member comprising a tubular housing, an end closure on one end of the housing having an opening including a notch operative to receive the end of said rod with the lateral extension received in the notch, a locking element slidably mounted within the tubular housing, guide means in the tubular housing in engagement with the locking element, means for biasing the locking element toward said end closure, the improvement consisting of said locking element comprising a disc-shaped member, at least one marginal edge portion of said disc-shaped member being spiraled outwardly therefrom around the periphery thereof towards said end closure, said guide means positioning the locking element with a portion of said marginal edge portion in alignment with said notch in the end closure of the tubular housing whereby insertion of the rod of the male member through the end closure results in contact of the lateral extension with said marginal edge portion and forces the locking element away from the end closure with said marginal edge portion camming the lateral extension to rotate the male member about its axis after insertion of the lateral extension through said end closure.

2. A coupling as defined in claim 1 and further characterized in that said locking element has a central opening to receive the rod of the male member, said central opening being of slightly greater diameter than the diameter of the rod thereby positioning the rod centrally with respect to the locking element, said lateral extension being located intermediate the ends of the rod whereby a portion of said rod projects forwardly thereof to be received in the central opening of the locking element.

3. A coupling as defined in claim 2 and further characterized in that the portion of the rod rearwardly of the lateral extension has an enlarged diameter with respect to the portion of the rod forwardly of the lateral extension, the opening in the end closure of the housing being of slightly greater diameter than said enlarged portion of the rod whereby the rod is guided and positioned with respect to the housing after insertion of the lateral extension through said end closure.

4. A coupling as defined in claim 1 and further characterized in that said guide means comprises a cylindrical body received in said housing and forming a press fit therewith to prevent rotation of the cylindrical body with respect to the tubular housing, at least one guide rod extending from said cyclindrical body towards said end closure, said locking elements having a notch in the outer periphery and received on said guide rod to thereby prevent rotation of the locking element with respect to the tubular housing while permitting longitudinal sliding of the locking element within said tubular housing.

5. A coupling as defined in claim 4 and further characterized in that the cylindrical body of said guide means is hollow, the means for biasing the locking element comprising a spring, said spring being received within said cylindrical body.

6. A coupling as defined in claim 1 and further characterized in that said rod has two lateral extensions adjacent one end thereof, said lateral extensions being diametrically opposed, the opening in the end closure of the housing having a pair of notches to receive said lateral extensions, said disc-shaped member having two marginal edge portions which are spiraled outwardly in the same rotative direction around the periphery of the member towards the end closure whereby a balanced pressure is applied to the locking element upon insertion of the male member.

7. A coupling as defined in claim 1 and further characterized in that said marginal edge portion of the disc-shaped member has a surface for contact with at least one edge of the lateral extension, said surface following a path defined by the longitudinal and rotative movement of said edge of the lateral extensions during its insertion thereof into the female member.

8. A coupling as defined in claim 1 and further characterized in that said marginal edge portion of the disc-shaped member terminates adjacent to said guide means in the tubular housing, said lateral extension being configured to contact the guide means after being cammed over said marginal edge portion whereby said guide means functions to limit the extent of rotation of the male member.

9. A coupling as defined in claim 1 and further characterized in that the end closure on said one end of the housing is thicker than the wall thickness of said tubular housing.

10. In a coupling comprising a male member and a female member, the male member comprising a rod having at least two diametrically opposed lateral extensions adjacent one end thereof, the female member comprising a tubular housing, an end closure on one end of the housing having an opening including notch means operative to receive the end of said rod with the lateral extensions received in the notches, a locking element slidably mounted within the tubular housing, guide means in the tubular housing in engagement with the locking element, means for biasing the locking element toward said end closure, the improvemnt consisting of said locking element comprising a disc-shaped member, at least two marginal edge portions of said disc-shaped member being spiraled outwardly therefrom in the same rotative direction around the periphery toward said end closure, said guide means positioning the locking element with a portion of said marginal edge portions in alignment with said notch means in the end closure of the tubular housing, said locking element having a central opening to receive the rod of the male member, said central opening being of slightly greater diameter than the diameter of the rod thereby positioning the rod centrally with respect to the locking element, said lateral extensions being located intermediate the ends of the rod whereby a portion of said rod projects forwardly to be received in the central opening of the locking element, insertion of the rod of the male member through the end closure resulting in contact of the lateral extensions with said marginal edge portions to thereby force the locking element away from the end closure with said marginal edge portions camming the lateral extensions to rotate the male member about its axis after insertion of the lateral extensions through said end closure.

11. A coupling as defined in claim 10 and further characterized in that the portion of the rod rearwardly of the lateral extensions has an enlarged diameter with respect to the portion of the rod forwardly of the lateral extensions, the opening in the end closure of the housing being of slightly greater diameter with respect to the diameter of the portion of the rod forwardly of the lateral extensions, the opening in the end closure of the housing being of slightly greater diameter than said enlarged portion of the rod, whereby the rod is guided and positioned with respect to the housing after insertion of the lateral extensions through said end closure.

12. A coupling as defined in claim 10 and further characterized in that said marginal edge portions of the disc-shaped member each have a surface for contact with at least one edge of a lateral extension, said surfaces following a path defined by the longitudinal and rotative movement of said edges of the lateral extensions during insertion thereof into the female member.

References Cited

UNITED STATES PATENTS

| | | | |
|---|---|---|---|
| 1,199,690 | 9/1916 | Gillan | 24—221 |
| 2,282,360 | 5/1942 | Horrocks | 24—221 |
| 3,286,316 | 11/1966 | Marosy | 24—221 |

DONALD A. GRIFFIN, Primary Examiner